(No Model.)
G. K. SPITZENBERG.
MARKING CORD.
No. 603,157. Patented Apr. 26, 1898.
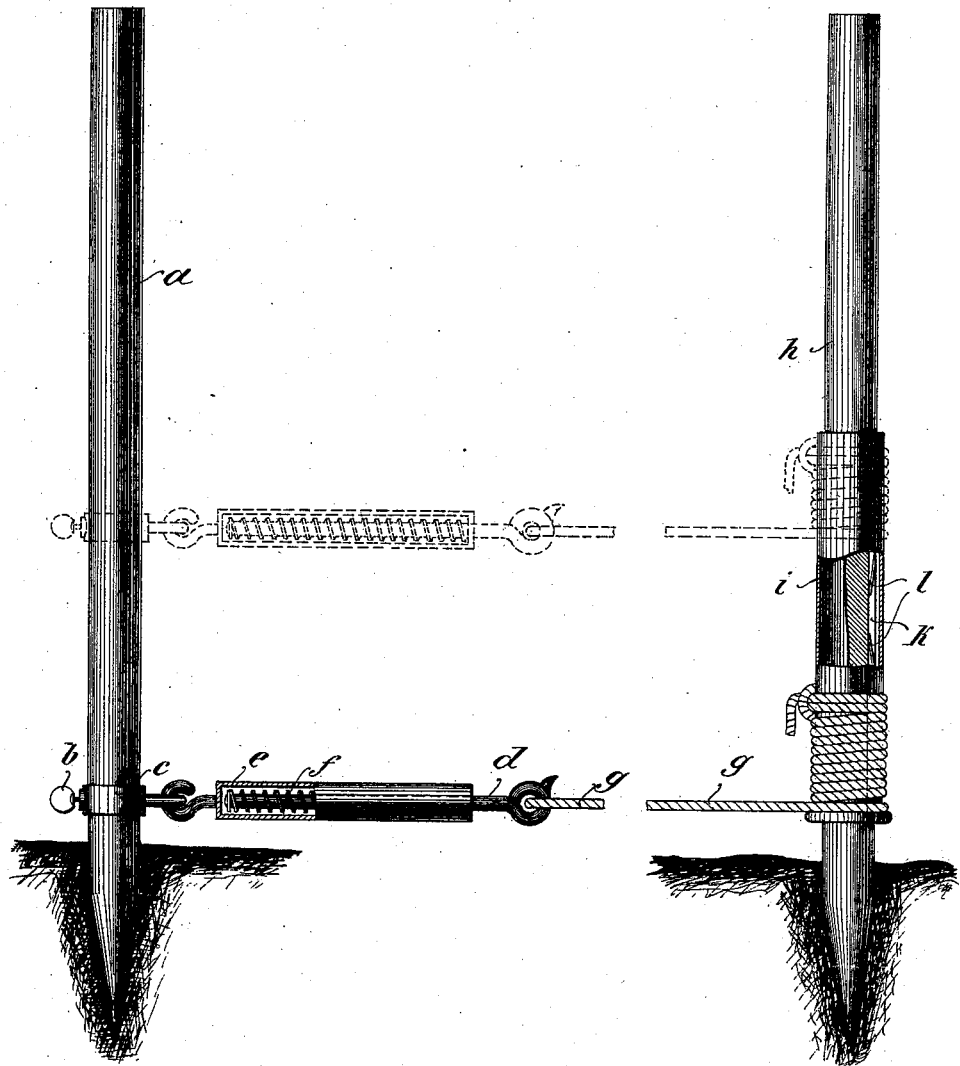

UNITED STATES PATENT OFFICE.

GEORG KARL SPITZENBERG, OF THARANDT, GERMANY.

MARKING-CORD.

SPECIFICATION forming part of Letters Patent No. 603,157, dated April 26, 1898.

Application filed December 22, 1897. Serial No. 663,035. (No model.) Patented in Germany September 26, 1895, No. 88,905; in Austria June 1, 1896, No. 46/2,431; in Hungary June 1, 1896, No. 6,085; in France June 1, 1896, No. 256,823, and in England June 1, 1896, No. 11,915.

*To all whom it may concern:*

Be it known that I, GEORG KARL SPITZENBERG, forestry expert, a subject of the King of Prussia, Emperor of Germany, and a resident of Tharandt, Saxony, Germany, have invented new and useful Improvements in Marking-Cords, (for which I have obtained Letters Patent in Germany, No. 88,905, dated September 26, 1895; in Austria, No. 46/2,431, dated June 1, 1896; in Hungary, No. 6,085, dated June 1, 1896; in France, No. 256,823, dated June 1, 1896, and in Great Britain, No. 11,915, dated June 1, 1896,) of which the following is a full, clear, and exact description.

My invention relates to marking-cords, and has for its object to improve the manner of operation of such apparatus.

In using the usual marking-cords in forestry, agricultural and horticultural, the cord easily loses its tension in consequence of the influence of the weather or other cause and requires to be again stretched, and when it is required to be used at different heights it must be loosened and again fastened. If the cord as hitherto used is wound on the stakes, the latter of course can only be put into the ground so far as the cord allows; but as the ground is never equally hard and not always even it happens, for instance, that the stakes at one place cannot be put so deep into the ground as it was supposed when the cord was wound around the stakes. The cord is then either too high or the stakes must be pushed with force and by loss of time so far into the ground until the cord is at the desired height. As in this manipulation the cord easily loses its tension it must generally be stretched again, whereby a further loss of time is occasioned. If the ground, however, is loosened to a greater depth than the length of the point of the stake left free to be put into the ground, the stakes are not sufficiently fastened, as they cannot penetrate sufficiently deep into the ground on account of the too low fastening of the cord. In order to avoid this inconvenience, the cord must then be taken off and again be fixed at the desired height upon the stakes. This time-wasting manipulation is also necessary when the level of the ground is uneven and in cases where the cord is to be used either close upon the ground, for instance, when making a groove or trench, or at a certain height above the ground, for instance, in order to arrange higher plants. These inconveniences are avoided by this invention, according to which the cord provided with a stretching device can be displaced easily and quickly to any height on the stakes.

The drawing represents an elevational view of my invention with portions broken out and showing the parts all in operative position.

As the annexed drawing shows, the stakes are driven in the usual way into the ground to the depth desired, the one stake $a$ being provided with a movable socket $c$, which may be fixed at any height by means of a screw $b$ and on which is fixed the stretching device. The latter consists of a rod $d$, which, under the effect of a spiral spring $f$, is incased in the socket $e$ and receives the one end of the cord $g$. The cord is fixed with its other end to the second stake $h$ in such a manner that it is not wound directly around the stake, but upon a reel $i$, which may be moved up and down on the stake $h$ and fixed automatically by two springs $l$, engaging in a groove $k$ of the stake $h$.

If the cord $g$ is moved by any cause from its straight position, it always returns to it under the effect of the spring $f$, while it may be displaced to any height both on the stake $a$ and on the stake $h$ without being loosened and again fixed, as may be seen from the two positions of the cord shown in full and dotted lines, respectively, in the drawing.

Having thus described my invention, I claim as new and desire to secure by Letters Patent—

1. The combination of two stakes adapted to be planted vertically in the ground, a movable socket attached to one stake, a cylinder in connection with said socket, a rod slidable in the cylinder, a spring in connection with the cylinder and rod, whereby to normally draw the rod within the cylinder, a cord attached to the rod, a reel embracing the remaining stake and having the cord wound thereon, and a spring attached to the interior wall of the reel, the stake of the reel having a groove receiving the spring, whereby to hold the reel.

2. In a marking apparatus, the combination of a stake having a longitudinally-extending groove therein, a reel fitted on the stake and movable thereon and a spring attached to the reel and extending into the slot in the stake, whereby to adjustably hold the reel.

3. In a marking apparatus, the combination of two stakes, a tension device in connection with one of said stakes, a reel movable on and surrounding the other of said stakes, a spring attached to the reel and engaging the stake thereof, and a cord in connection with the reel and with the tension device.

In testimony whereof I have signed this specification in the presence of two subscribing witnesses.

GEORG KARL SPITZENBERG.

Witnesses:
HERNANDO DE SOTO,
PAUL ARRAS.